July 11, 1933.    B. M. S. KALLING ET AL    1,917,942
METHOD AND APPARATUS FOR HEAT TREATMENT OF MATERIALS IN ROTARY FURNACES
Filed Dec. 7, 1929    2 Sheets-Sheet 1

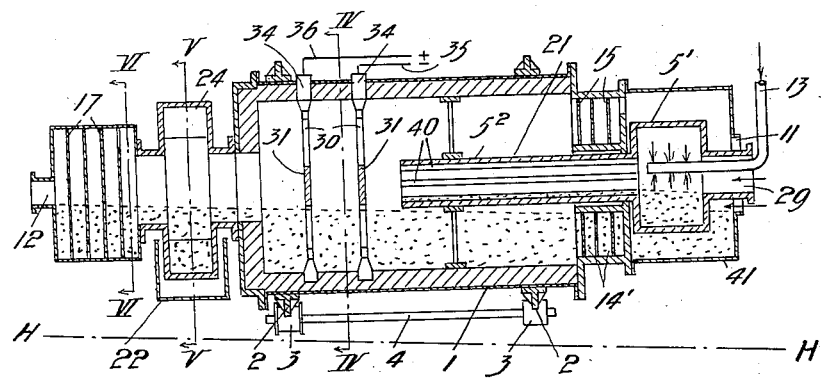

Patented July 11, 1933

1,917,942

UNITED STATES PATENT OFFICE

BO MICHAËL STURE KALLING AND CARL VON DELWIG, OF AVESTA, SWEDEN, ASSIGNORS TO A. JOHNSON & CO., OF STOCKHOLM, SWEDEN, A COMPANY OF SWEDEN

METHOD AND APPARATUS FOR HEAT TREATMENT OF MATERIALS IN ROTARY FURNACES

Application filed December 7, 1929, Serial No. 412,517, and in Sweden December 10, 1928.

The present invention has for its object method and apparatus for preheating and possibly preliminary reduction of the charge in the reduction of ores with carbon in rotary furnaces preferably electrically heated rotary furnaces by use of gas rich in carbon monoxide.

Different methods have been proposed for bringing about such a preheating, which all, as far as we know, have been characterized in that the preheating takes place in a special furnace, separate from the reduction furnace. Thereby it has been proposed to carry out the preheating either in such a way that the combustion of the gas and the heating of the charge take place in the same furnace chamber, or in such a way that the gas is burnt in an outer furnace chamber, wholly or in part surrounding the charging chamber. The first mentioned method has the disadvantage that in such a combustion, where the charge is present, always part of the charge carbon is simultaneously burnt which causes an increase in the consumption of carbon. The latter method again is difficult to carry out with good economy, as the losses due to radiation must be relatively heavy.

Also according to the present invention the preheating is carried out in a furnace consisting of a central furnace chamber and a furnace chamber surrounding the same, but with the essential difference that the gas according to the present invention is supplied to and possibly wholly or in part burnt in the inner furnace chamber, the walls of which in its turn transfer the heat to the charge in the outer chamber.

Of course said preheating device may be constructed as a preheating furnace wholly separated from the furnace for the final reduction, but in order to decrease the losses due to radiation and to make the plant more simple, it will be most suitable to arrange the preheating device within the same furnace as that where the final reduction takes place.

In order to obtain a sufficiently rapid transmission of heat between the inner and outer furnace chamber the partition wall between said chambers should be made of as good a heat conducting material as possible. It is suitable to make the same of some heat resisting metal alloy. The heat transmission may be further improved by making the wall corrugated or in another way give it such a form that a great transmission surface is obtained, for instance by arranging outer and/or inner flanges thereon.

Generally the preheating serves several purposes. To begin with the charge is to be dried, and the steam thereby formed should be removed from the furnace without coming into contact with the carbonaceous material after said material having been further heated, because in such a case a chemical combination with the carbon takes place causing an increased consumption of the carbon. Thereafter the dry charge is to be heated to a desired temperature as it enters the zone for the final reduction. In certain cases, as in the reduction of iron ore, it should be endeavoured to bring about a preliminary reduction of the ore, and it is most economical to make the prereduction to take place before the ore has been mixed with the reduction carbon. Besides this it may be desirable to roast the ore, prior to the reduction thereof.

In order to obtain favourable conditions from this point of view the preheating may be arranged in such a way that a lock is arranged at a suitable point of the outer charge chamber, i. e. in the space between the inner and outer chamber, which lock is constructed so as to allow the charge material to pass but not the reaction gases. Thereby the steam formed by the drying treatment will be forced back and will leave the furnace at the feeding end, whereas the high carbon monoxide gas formed during the reduction after the passage of the material through the lock is forced to pass out through the combustion chamber. By this arrangement roasting and/or prereduction of the ore, prior to the mixing thereof with the carbonaceous material may be carried out in such a way that the ore is charged into the combustion chamber while the carbon or carbonaceous material only is charged into the outer chamber. The combustion of the gas must then be regulated in such a manner that the combustion in the outer end of the combustion chamber will have an oxidizing effect, if roasting of the ore is desired, and a reducing effect in the inner end, if prereduction of the ore there is desired.

For illustrating the invention there is shown on the accompanying drawings as example a furnace suitable for carrying out the method.

Figures 1 and 2 show a form of construction of the furnace. Figure 1 is a longitudinal section, and Figure 2 a cross-section on the lines II—II in Figure 1. The line H—H is a horizontal line for indicating the approximate inclination of the furnace.

Figures 3–7 show another form of construction of the furnace. Figure 3 is a vertical section on the lines III—III in Figure 4, which shows a cross section on the line IV—IV in Figure 3.

Figures 5 and 6 show cross sections on the line V—V respectively VI—VI in Figure 3. Figure 7 is a partial longitudinal section of the rotary furnace illustrating another form of construction of the electrodes.

Figure 1:
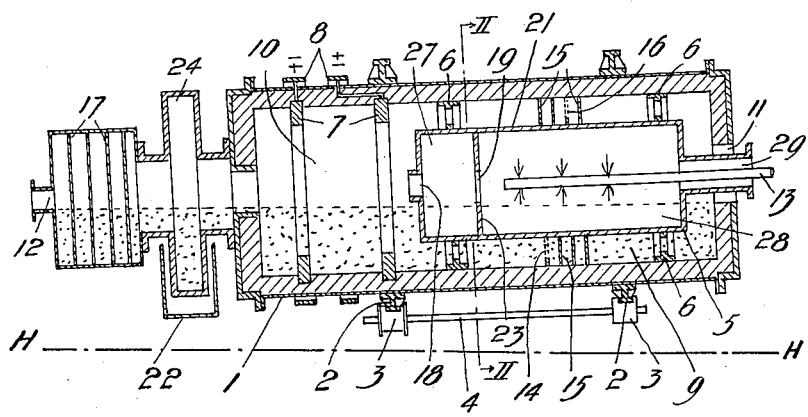

As may be seen from the drawings the characteristic features of the construction of the furnace shown in Figure 3 are similar to those illustrated in Figure 1 although the construction is different from that shown in Figure 1 with regard to several details, specially as to the form of the electrodes, besides which the combustion chamber and the drying chamber are formed in another way. In the different figures corresponding parts are provided with the same ciphers of reference. The invention is first described with reference to Figures 1 and 2.

1 is the rotary furnace which is constructed as a rotatably arranged drum which on its periphery in a known manner is provided with rings 2, resting on the rollers 3 supporting the furnace, said rollers, according to the form shown, being arranged two and two on a shaft 4 and possibly in a known manner arranged so as to serve for rotating the furnace 1. 5 is a centrally arranged chamber within the furnace, supported in the furnace by means of stays or beams 6 suitable for the purpose. 7 indicates contact rings or electrodes arranged in the furnace which are in conductive connection with current supplying devices 8. 9 is the compartment of the furnace, the drying compartment, where the charge is being dried, and 10 is the compartment serving for the final reduction, the final reduction compartment. 11 is an opening arranged in the end wall of the furnace at the charging end for supplying the solid charge. 12 is the discharge opening for the treated material. 13 is an air conduit for supplying combustion air to the chamber 5, which conduit suitably is provided with perforations so that the air will be distributed in the chamber as indicated on the drawings.

The charge, consisting of ore and reducing agents, is fed through the opening 11 and is dried in the drying compartment 9. Thereafter it passes through the lock device 14, arranged in the space between the combustion chamber 5 and the inner wall of the furnace. According to the illustrated form of construction said lock device is made of four angular partition walls 15 arranged at some distance from each other, each of which at the periphery being provided with a minor opening or recess 16, said opening in the different partition walls being so distributed or located in relation to each other that always one of them is closed by the charge during the operation. However, during the rotation of the furnace the charge can pass through one opening after the other, whereas practically no gas transmission through the lock device is possible, as it is prevented by the solid charge, and therefore the gases, formed in the drying compartment leave the furnace through the opening 11, and the gases formed during the continued heating and reduction of the charge, i. e. after the charge has passed said lock, are by means of a similar lock 17 at the discharge end forced to pass through the opening 18, 19 respectively into the combustion chamber, from where the combustion gases pass out through the opening 29 at the feeding end. The charge having passed through the lock 14 is further preheated by heat transmitted from the combustion chamber through the wall 21 thereof, and the charge is thereby possibly in part reduced, before reaching the zone 10 for the final reduction where it is further reduced while heated by electric current supplied to the charge by the electrodes 7. Thereafter the reduced product enters into the cooling chamber 24—for instance having the form of a flange like portion entering the container 22 containing cooling liquid—and leaves the furnace in a cool condition after having passed the lock 17.

If it is desired to roast the ore before mixing it with the carbon said roasting may be carried out in such a way that the ore is charged into the combustion chamber through the opening 29 and mixed with the carbon supplied to the chamber 9 only after having passed the combustion chamber and out through the openings 18. The combustion of the gases must then be regulated in such a way that the atmosphere in the combustion chamber, at least in the part adjacent the feeding end, the outer part, will be sufficiently oxidizing.

Also the prereduction of the ore may be carried out by keeping a sufficiently reducing atmosphere in the inner part of the combustion chamber, and then it may be suitable to divide the prereduction chamber 27 from the preheating and roasting chamber 28 by means of a partition wall 23 provided with a centrally arranged opening 19. The wall 21 of the combustion chamber is preferably corrugated and/or provided with outer and/or inner flanges for increasing the heat transmitting surface thereof.

The advantages which may be gained in the use of the furnace carried out according to the above mentioned principles are inter alia the following.

1. The preheating (and possibly roasting and prereduction) may with regard to the heat be economically carried out as the source of heat is placed in the central part of the furnace so that the heat passing through the outside space or chamber 9 very effectively will be taken up by the material to be treated during the rotation of the furnace.

2. On account thereof that the combustion air is supplied at the central part it is very easy to arrange the supply of air and regulate it as desired, although the furnace rotates.

3. The combustion may easily be carried out in the same furnace as that for the final reduction whereby a rational construction is possible.

4. If desired it is possible to roast and prereduce the ore, before mixing it with the reducing carbon.

The use of a suitable construction of electrodes is of essential importance for the operation of rotary furnaces intended for carrying out the present method. If, as hitherto usual, the electrodes are formed as rings arranged at a certain distance from each other and resting against the wall of the furnace or entering into the same, a leakage of current may easily take place between the rings or electrodes. At an occasionally increased temperature it may namely happen that the iron sponge formed sinter or cake on the wall at some point between the electrodes. Hereby the electrical resistance is reduced at this point which has for consequence a concentration of the current causing a further rise of the temperature and an increased caking of the iron. In such a way a bridge of iron rapidly may be formed between the electrodes, so that a short circuit and interruption in the work arise. According to the form of construction of the furnace shown in Figures 3–7 the electrodes are so constructed that the contact surface between the electrodes and the walls will be compartively small in relation to the effective surface of the electrodes. Suitably radially arranged rod like parts are chosen according to this principle instead of angular electrodes which rods advantageously may be placed in the same way as the spokes in a wheel. The contact surfaces between the electrodes and the furnace wall may then be made very small and still form a stable construction. Of course, this may also be obtained by other forms of construction than that shown on the drawings in Figures 3 and 4. The electrodes may, for instance, be formed as rings (see Figure 7, or as angular discs having a smaller diameter than the furnace chamber and kept in position at the furnace wall only by means of one or more supports which simultaneously may serve for supplying the current to the ring or disc.

A good result may be attained also in another way. Of greatest importance is that the contact surface with the masonry or lining of the furnace wall is as small as possible or wholly eliminated in the hottest zone of the furnace. But in the cooler parts of the furnace such a contact can cause no inconvenience. Thus the electrodes may advantageously be carried by supporting members fastened to the wall of the furnace at some distance from the zone passed by the current.

Another advantage gained by constructing the electrodes in such a way that the main part of the effective surfaces thereof will be located at some distance from the furnace wall is also that the essential heat generation takes place at a certain distance from the furnace wall so that said wall may be kept at a comparatively low temperature and thus the losses due to radiation become smaller.

In Figures 3 and 4 is shown a form of construction of the electrodes when radially arranged within each phase whereby it is endeavoured to keep a comparatively large effective surface in connection with a small contact surface (or contact line) with the furnace wall (in the direction of the periphery).

Figure 7 shows a form of construction having ring shaped electrodes of smaller diameter than that of the furnace chamber, whereby the supports enter into the furnace wall in cooler zones of the furnace.

The electrodes may be made of carbon, graphite, iron, some heat resisting alloy or some other suitable electrically conducting material.

In the reduction process in question it is of great importance for carrying out the process in an economical way that the high carbon monoxide gas formed in the zone for the final reduction is utilized as far as possible in the process as a reducing agent and source of heat. This is possible to a higher extent only if the ore is prereduced by the gas before the ore and the carbon are mixed. A higher content of carbon dioxide may then be obtained in the escaping gas than if carbon simultaneously were present.

According to the form of construction shown in Figures 3–7 said result is attained in such a way that the furnace at the feeding end is provided with a central tube or pipe suitably made of a heat resisting alloy, said tube reaching some distance into the furnace. The ore is fed through said tube, preferably in form of concentrate or finely crushed ore, and the gas formed in the furnace during the process passes out in opposite direction and thereby brings about a prereduction of the ore. The carbon material is fed into the furnace outside the tube through some suitable lock device to prevent the gas from escaping said way. In order to obtain a satisfactory prereduction of the concentrate or finely crushed ore, it should first be heated, which simply may be done through combustion of the remaining combustible gases in the outer end of the tube by supplying air from outside through a tube of smaller diameter. In this manner roasting of the ore and purifying it from sulphur may also take place. If the carbon material is moist and if it is not desired to allow all this moisture to enter into the furnace chamber, that part of the tube where the ore is preheated may suitably be surrounded by a drum in which the carbon is charged before it is supplied to the furnace. The heat transmitted through the walls of the central tube then causes a heating and drying of the carbon material.

Figure 2:
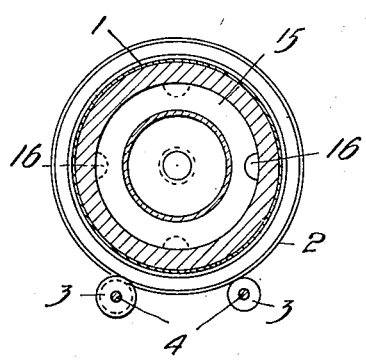

In Figures 3–7 corresponding parts are provided with the same ciphers of reference as in Figures 1 and 2.

Figures 3 and 4 show a form of construction of the electrodes according to which the electrodes are formed as radially arranged rods 30, suitably made in one piece in such a way that they have a common central part 31. As will be seen from the drawings their end portions 32 fastened to the furnace wall are tapered so that the length in the direction of the periphery, along which they are in contact with the furnace wall, is comparatively small, i. e. the contact surface of the electrodes with the furnace wall will be small compared with the effective contact surfaces of the electrodes with the mass through which the current is conducted. By means of the part 34 the electrodes are in conductive contact with the conductors 35, 36 for supplying current, which conductors may be connected to a source of current in a known manner, for instance through the mediation of contact brushes resting against contact rings or such like devices on the periphery of the furnace, which are electrically connected to the conductors 35, 36 respectively.

According to Figure 7 the electrodes 37 are formed as angular discs or rings of smaller diameter than the inner diameter of the furnace and arranged within the furnace in such a way that they are positioned at some distance from the furnace wall, causing the substantial part of the generation of heat to take place at a certain distance from the furnace wall so that said wall may be kept cooler and on account thereof the losses due to radiation will be smaller. The electrodes are carried by supports $37^1$ extending from the parts of the walls of the furnace chamber where the temperature is not as high as in the proper heating zone, i. e. the zone lying between the electrodes 37 or adjacent the same.

According to the form of construction illustrated in Figure 3 the combustion chamber $5^1$ is given the form of a drum fastened to the furnace and communicating with the centrally arranged tube $5^2$ extending into the proper furnace chamber and at the inner end suitably provided with vertically arranged flanges 40 in order that the particles of ore during the rotation of the furnace thereby may be raised and allowed to fall down again through the reduction gases flowing through the tube $5^2$. The carbon is fed into the drum 41 surrounding the preheating chamber arranged at the inlet end where it is dried, whereafter it enters the proper furnace chamber through the lock $14^1$, corresponding to the lock 14 according to Figure 1. Said lock is formed of partition walls 15 at the periphery provided with recesses or openings 16 as above described.

The cooling chamber is constructed substantially in the same way as shown in Figure 1. As indicated in Figure 5 it may suitably be provided with corrugated walls 42 so as to obtain a larger cooling surface. The cooled mass thereafter passes the lock 17 as above stated and pass out of the furnace system through the opening 12. Possibly the cooling chamber 24 may be provided with partition walls so that it simultaneously serves as a lock instead of the lock 17.

Earlier it has been proposed to reduce non-volatile metals and preferably iron out of their ores at such a low temperature that they do not smelt by using electric current for obtaining the necessary energy, whereby they are mixed with so much more carbon than necessary for carrying out the reduction that the carbon material also after the accomplishment of the reduction serves as the substantial resistance for the electric current passing through the charge and thereby generating the amount of heat necessary for the process. Charcoal powder has been proposed as being especially suitable as reducing agent.

The advantage gained by using charcoal as reducing agent in the reduction is in the first place that the charcoal on account of its porosity easily reacts with the carbon dioxide and the vaporized water formed in the reduction of the ore by means of the gas present containing carbon monoxide and hydrogen whereby carbon monoxide and hydrogen are regenerated. Further, contrary to the fossil coal, the charcoal is free from sulphur.

It has, however, been shown that the charcoal has a disadvantage when used as an electric resistance, said disadvantage being caused thereby that the resistance of the charcoal, which is comparatively high at low temperature, is rapidly reduced with increased temperature and specially so just within the range of temperature required in the reduction of iron ore (800–1000° C.). Consequently a very small difference in the temperature will cause a comparatively great variation of resistance. This makes it difficult to keep a uniform electric load and a uniform temperature in the furnace. On account of the low specific weight of the charcoal the heat capacity of the charge in the furnace will be comparatively small which increases the sensibility of the furnace with regard to variations in the energy supplied.

If it is endeavoured to use a fossil fuel, for instance coke as a reducing agent and resisting agent better conditions of current are obtained but simultaneously the above mentioned disadvantage of a slower reaction and the taking up of sulphur in the metal is caused. Certainly the velocity of reaction may be increased by increasing the temperature, but at a sufficient increase of the temperature there is a risk that the ore or the reduced metal will cake, which will make the technical accomplishment of the process more difficult.

In order to avoid said disadvantage a combination of different carbon materials may be used for the purpose in question. It has namely been shown that if a mixture of coke and charcoal in a sufficient excess is used as a reducing agent the reduction may be carried out without the coke taking any essential part in the reaction. The coke leaves the furnace practically unburnt and thus in reality the reduction has been carried out by means of charcoal. By proportioning the amount of charcoal to make it sufficient for the accomplishment of the reduction but leaving practically no excess a resistance material is obtained which at the beginning of the reduction consists of coke and charcoal and at the end thereof consists of practically only coke besides the ore and the metal formed. In such a way favourable conditions of current in the furnace are obtained. But at the same time the advantage is gained that the process may be carried out at a comparatively low temperature on account of the presence of the charcoal, and further a product free from sulphur is obtained, as the coke has not taken part in the reaction and thus has not given off the sulphur present therein.

A further improvement of the conditions may be obtained by a suitable choice of size of particles of the two carbon materials. The finer a material is the quicker the reaction must take place. The charcoal should therefore be finely pulverized, whereas the coke suitably may be of greater grains, whereby its contact surface with the gas will be comparatively small.

The method is, however, not confined to the use of the materials charcoal and coke. The material which substantially is to serve as resistance regulating material and which thus will not be consumed to any higher extent may consist of anthracite, graphite, crushed rests of carbon electrodes and other kinds of coal. Besides it is not at all necessary that it is coal. Certain metals and alloys, carbides (as carborundum) and other materials having suitable resistance but do not unfavourably take part in the reaction may serve the same purpose. Of course, also the charcoal may be substituted for another carbon material free from sulphur.

According to the method described above a product free from sulphur may be obtained also when using sulphurous coal in the charge. However it has been found advantageous to add also lime to certain charges, also when the reduction is carried out by means of charcoal, whereby the sulphur content in the metal is essentially reduced. The effect of the lime will be more powerful if it is finely pulverized, but it may also be supplied in form of greater grains or pieces which may facilitate the separation thereof from the remaining coal after it has been consumed on account that it has taken up sulphur.

Having thus described our invention we declare that what we claim is:—

The method of preheating and prereducing ores without melting, consisting in charging ore and carbonaceous materials, separate from each other, into a furnace, the one of said materials being fed into an inner chamber of the furnace, and the other material being fed into the space between the inner chamber and the walls of the furnace; preheating the materials by means of heat developed in burning combustible gases formed by the reducing process, said burning taking place out of direct contact with the carbon fed into the furnace, but in heat exchange relation to said carbon; and allowing the preheated ore and carbon to mix and react with each other so that a reduction of the ore by the action of the carbonaceous materials takes place, whereby said gases are developed.

In testimony whereof we affix our signatures.

BO MICHAËL STURE KALLING.
CARL von DELWIG.